United States Patent
Krishnakumar et al.

(10) Patent No.: US 9,282,148 B2
(45) Date of Patent: Mar. 8, 2016

(54) MULTI-USER PEER-TO-PEER COLLABORATION SYSTEM AND METHOD

(71) Applicants: Karthik Krishnakumar, Round Rock, TX (US); Bruce Montag, Austin, TX (US)

(72) Inventors: Karthik Krishnakumar, Round Rock, TX (US); Bruce Montag, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 348 days.

(21) Appl. No.: 13/911,836

(22) Filed: Jun. 6, 2013

(65) Prior Publication Data

US 2014/0365567 A1 Dec. 11, 2014

(51) Int. Cl.
*G06F 15/16* (2006.01)
*H04L 29/08* (2006.01)

(52) U.S. Cl.
CPC ................... *H04L 67/104* (2013.01)

(58) Field of Classification Search
CPC .................................................... H04L 67/104
USPC ................. 709/204, 205, 208, 217, 219, 220
See application file for complete search history.

(56) References Cited

U.S. PATENT DOCUMENTS

| | | | |
|---|---|---|---|
| 7,174,385 B2 * | 2/2007 | Li | 709/231 |
| 8,930,492 B2 * | 1/2015 | Brown et al. | 709/217 |
| 2013/0040576 A1 | 2/2013 | Yoon | |
| 2013/0044739 A1 | 2/2013 | Huang | |
| 2013/0148545 A1 | 6/2013 | Jung | |
| 2014/0053214 A1 * | 2/2014 | Walker et al. | 725/62 |
| 2014/0245162 A1 * | 8/2014 | Deibler et al. | 715/737 |

* cited by examiner

*Primary Examiner* — Viet Vu
(74) *Attorney, Agent, or Firm* — Baker Botts L.L.P.

(57) ABSTRACT

In accordance with the present disclosure, multi-user peer-to-peer collaboration systems and methods are described herein. An example method may include establishing peer-to-peer communications channels with end-user devices. Display signals may be received from each of the end-user devices over the peer-to-peer communications channels. Each end-user device may transmit a separate display of a separate peer-to-peer communications channel. A composite data stream may be generated from the display signals. The composite data stream may comprise a subset of the display signals. The method may further include outputting the composite data stream to a display device.

20 Claims, 4 Drawing Sheets

MULTI-USER PEER-TO-PEER COLLABORATION SYSTEM AND METHOD

TECHNICAL FIELD

The present disclosure relates generally to the operation of computer systems and information handling systems, and, more particularly, to multi-user peer-to-peer collaboration systems and methods.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems are increasingly more important for the participation in and facilitation of collaborative environments. These environments include, for example, classroom settings, work presentations, and video gaming. The environments can be dynamic, with the number of participants in and the focus of the collaborative effort changing rapidly. Likewise, the collaborative environments can be highly variable, with the requirements of an online gaming session differing drastically from a collaborative classroom teaching exercise. Existing systems are typically limited to the types of collaborative environments in which they can be used as well as in their capacity to adapt to changes within a given environment.

SUMMARY

In accordance with the present disclosure, multi-user peer-to-peer collaboration systems and methods are described herein. An example method may include establishing peer-to-peer communications channels with end-user devices. Display signals may be received from each of the end-user devices over the peer-to-peer communications channels. Each end-user device may transmit a separate display of a separate peer-to-peer communications channel. A composite data stream may be generated from the display signals. The composite data stream may comprise a subset of the display signals. The method may further include outputting the composite data stream to a display device.

The system and method disclosed herein is technically advantageous because it allows for flexibility and variability in collaborative environments. For example, the number of participants and end-devices and information handling systems that may join a network for a collaborative environment may be flexible. Additionally, the various standards used to transmit data within the collaborative environment may be accounted for, instead of requiring transmissions based on one standard. Likewise, the systems and method described herein may afford flexibility regarding the selection of information to display within the collaborative environment. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
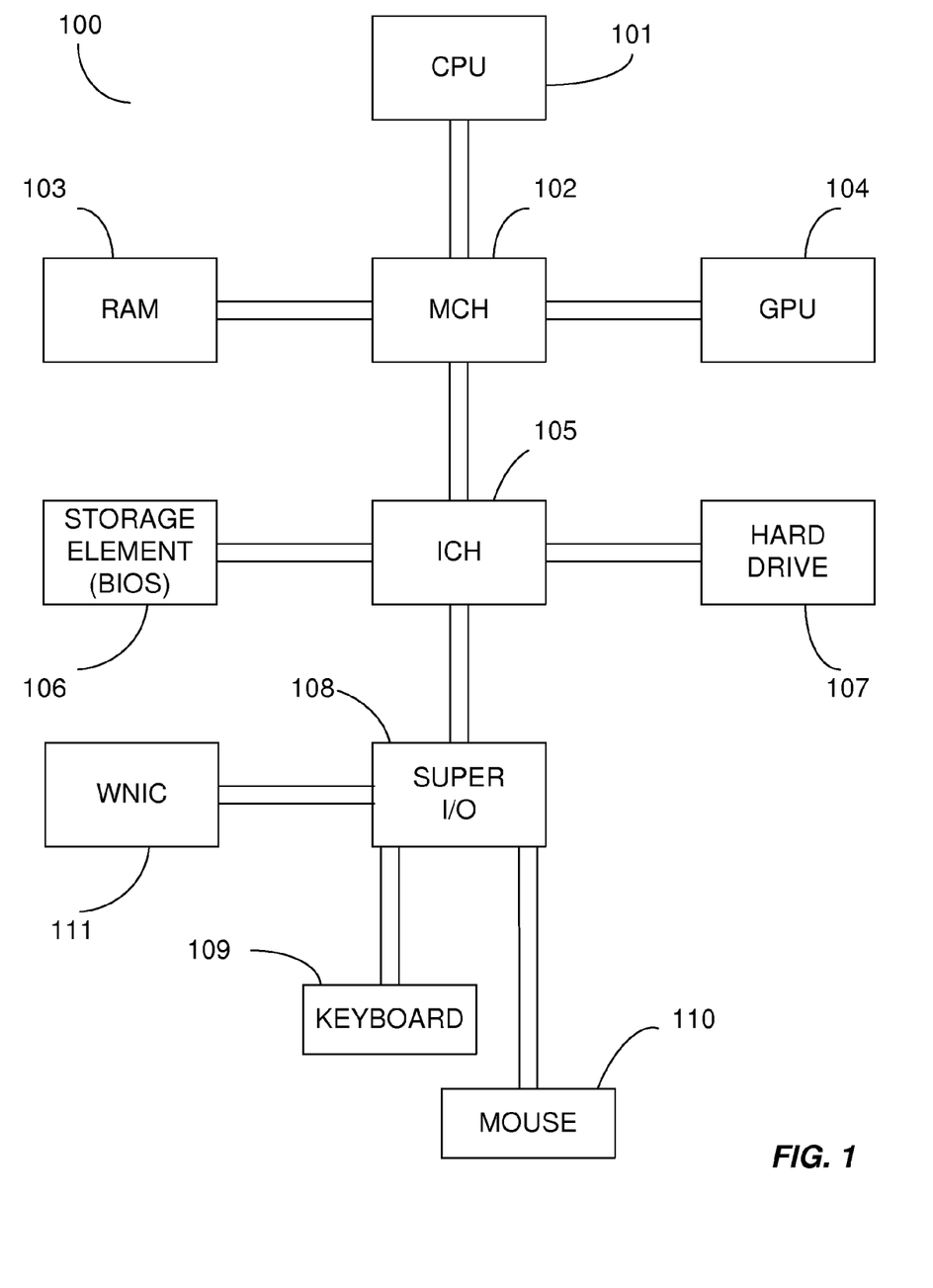
FIG. 1 is a block diagram of an example information handling system, according to aspects of the present disclosure.

Shown in FIG. 1 is a block diagram of an example information handling system 100. It should be appreciated that the information handling system 100 is only one example of an information handling system. Other information handling systems may have different configurations from information handling system 100 yet still be an information handling system within the scope of this disclosure. For example, information handling systems may include various end-user devices that a human user may interface with directly, such as laptop computers, desktop computers, tablets, smartphones, video game devices, smart televisions, etc. Information handling systems may also include various other devices, including servers, switches, routers, and other devices that may be used to establish a network.

In information handling system 100, a processor or CPU 101 may be communicatively coupled to a memory controller hub or north bridge 102. Memory controller hub 102 may include a memory controller for directing information to or from various system memory components within the information handling system, such as RAM 103, storage element 106, and hard drive 107. The memory controller hub 102 may be coupled to RAM 103 and a graphics processing unit 104. Memory controller hub 102 may also be coupled to an I/O controller hub or south bridge 105. I/O hub 105 is coupled to storage elements of the computer system, including a storage element 106, which may comprise a flash read only memory (ROM) that includes a basic input/output system (BIOS) of the computer system. I/O hub 105 is also coupled to the hard drive 107 of the computer system. I/O hub 105 may also be coupled to a Super I/O chip 108, which is itself coupled to several of the I/O ports of the computer system, including keyboard 109 and mouse 110.

The Super I/O chip may also be connected to a wireless network interface card (WNIC) 111. The WNIC 111 may provide a communication channel through which the information handling system 100 may communicate with various local and wide area networks, as well as to internet service providers. The WNIC 111 may support an infrastructure mode in which the WNIC 111 connects to a wireless access point, such as a wireless router. When the WNIC 111 is in infrastructure mode, the information handling system 100 may only communicate with other network devices through the wireless access point. The WNIC 111 may also support an ad hoc mode in which the WNIC 111 connects directly to other network devices, such as another end-user device within the network. When the WNIC 111 is in ad hoc mode, the information handling system 100 may communicate with other network devices directly rather than going through the wireless access point.

Figure 2:
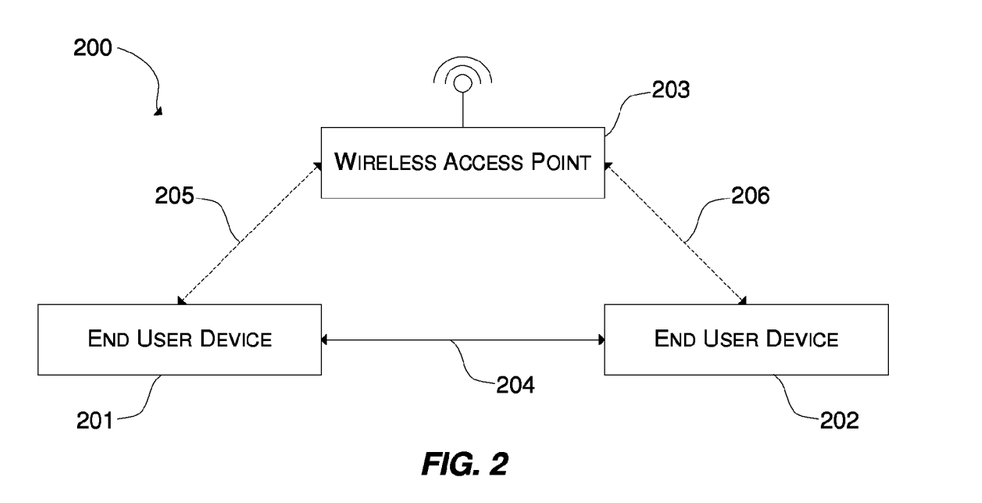
FIG. 2 is a diagram of an example peer-to-peer network connection, according to aspects of the present disclosure.

FIG. 2 is a diagram of an example peer-to-peer network 200, according to aspects of the present disclosure. A peer-to-peer network 200 may allow information handling systems 201 and 202 in the network 200 to communicate directly, allowing shared access to network resources such as files, peripherals, and sensors without communicating through a wireless access point (WAP) 203. Information handling systems 201 and 202, for example, may comprise end-user devices such as laptop computers, tablets, or smartphones. End-user device 201 may communicate wirelessly with end-user device 202 over communications channel 204. Communication channel 204 may be generated, for example, using the Wi-Fi Direct standard, which may be used to establish a wireless peer-to-peer network. Other connection methods and standards are possible, without requiring the use of the Wi-Fi Direct standard.

Notably, both of the end-user devices 201 and 202 may establish separate communications channels 205 and 206, respectively, with the WAP 203. The WAP 203 may comprise a wireless router that is connected via a modem with an internet service provider. End-user device 201, for example, may access the internet or another wide area network through the WAP 203 over communications channel 205 while participating in a peer-to-peer network with end-user device 202. This may allow flexibility regarding network participation and communication with external information sources.

Figure 3:
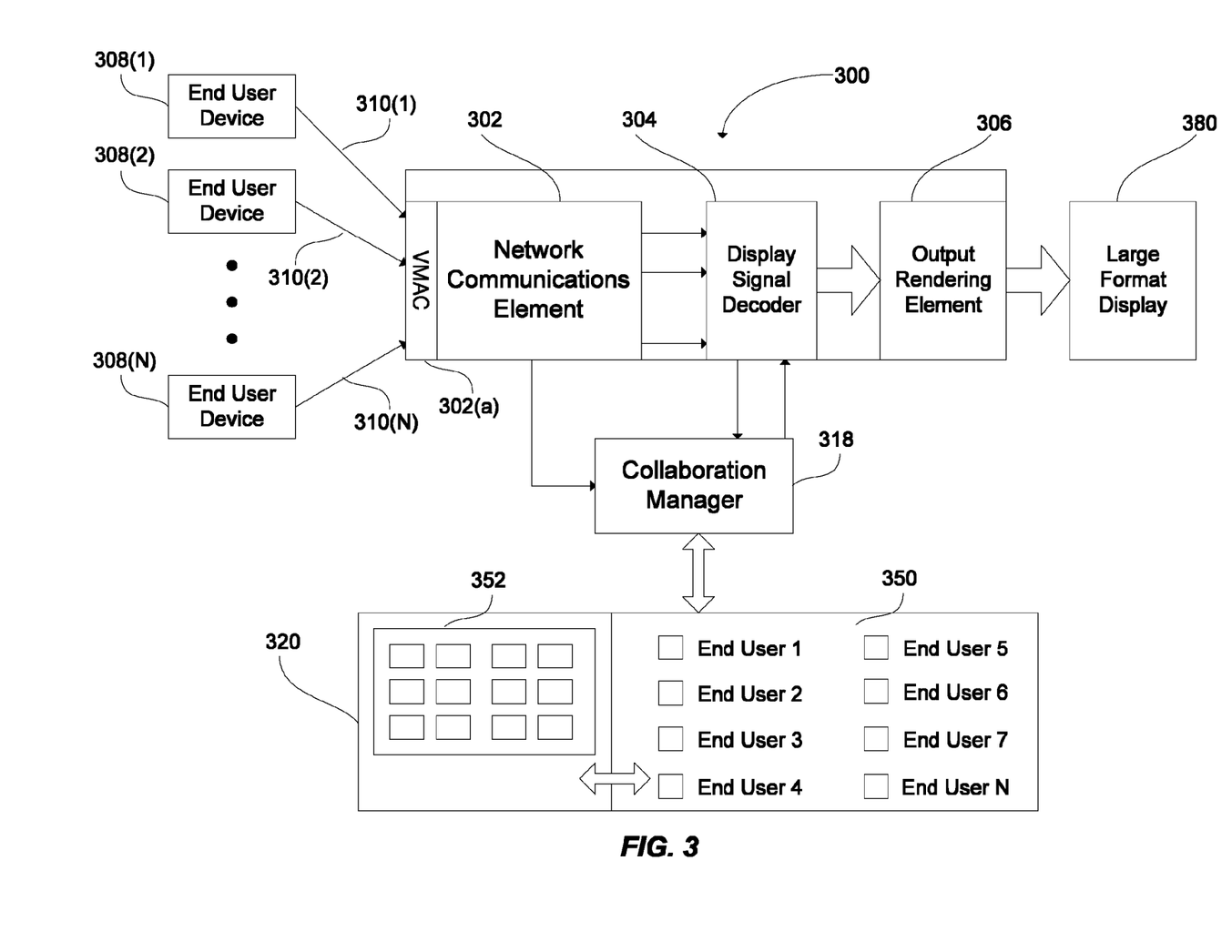
FIG. 3 is a diagram of an example multi-user peer-to-peer collaboration system, according to aspects of the present disclosure.

FIG. 3 is a diagram of an example multi-user peer-to-peer collaboration system 300, according to aspects of the present disclosure. The system 300 may comprise a stand-alone information handling system with the configuration described herein, or may be incorporated into another device. For example, the system 300 may be incorporated into a large format display system such as a high definition projector or a large monitor or television display for use in a collaborative environment. As will be described below, the system 300 may cooperate and communicate with a large format display, such a projector or a large monitor, to show display streams from end-user devices connected to the system 300. Although the system 300 is described below in the context of the large screen display, other implementations are possible, and the description herein is not intended to be limiting.

The system 300 may comprise a network communication element 302. The network communications element 302 may be used to communicate with multiple end-user devices 308(1)-(N). In certain embodiments, the network communications element 302 may comprise a wireless network interface card, which may function according to the Wi-Fi Direct standard described above. The network communication element 302 may establish peer-to-peer communications channels 310(1)-(N) with end-user device 308(1)-(N), respectively. The peer-to-peer communications channels 310(1)-(N) may be established over a variety of wireless frequency bands, including 2.4 GHz, 5 GHz, and 60 GHz, using standards such as Institute of Electrical and Electronics Engineers (IEEE) 802.11a, 802.11b, 802.11g, 802.11n, and 802.11 ac.

In certain embodiments, the respective peer-to-peer communications channels 310(1)-(N) between the network communications element 302 and end-user devices 308(1)-(N) may be established using virtual media access control (VMAC) 302a. Specifically, the network communications element 302 may include a VMAC address and each of the end-user devices 308(1)-(N) may have a separate media access control (MAC) addresses that may uniquely identify the respective end-user devices 308(1)-(N). The VMAC and MAC addresses may be used to facilitate communications between the end-user devices 308(1)-(N) and the network communications element 302. Notably, the number of end-user devices 308(1)-(N) may be variable, and the network communications element 302 may dynamically connect to new devices as they join the collaborative environment.

In the embodiment shown, the end-user devices 308(1)-(N) may stream video signals over the peer-to-peer communications channels 310(1)-(N) to the network communications element 302. The video signal of a particular end-user device may comprise a display signal that corresponds to real-time images shown in a display element, such as a monitor or screen, of the corresponding end-user device. For example, if end-user device 308(1) comprises a tablet computer, the display signal may correspond to the images displayed in a screen of the tablet computer at any given time.

Each of the end-user devices 308(1)-(N) may transmit its display signal over its respective communications channel 310(1)-(N) using one of a variety of transport standards, and the network communications element 302 may receive the display signals. One example transport standard is the Miracast peer-to-peer wireless screencast standard created by the Wi-Fi Alliance. Miracast may emulate a High-Definition Multimedia Interface (HDMI) interface and may copy everything from the screen of one device (e.g. an end-user device) and transmit it using an H.264 codec for video compression. Another example transport standard is the Digital Living Network Alliance (DLNA) standard the enable the sharing of digital media between end-user devices. DLNA may use Universal Plug and Play (UPnP) and may transmit video using an H.262 codec for video compression. Another example transport standard is the WiGig Display Extension (WDE) standard created by the Wireless Gigabit Alliance. WDE may allow transmission of both compressed and uncompressed video signals. Other similar transport standards may be used, as the specification is not limited to the standards described herein.

The network communications element 302 may communicate with a display signal decoder 304 of the system 300. The display signal decoder 304 may comprise a software program executed on a general processor of the system 300, or may be implemented using a devoted graphics processor within the system 300. The display signal decoder 304 may include or have access to numerous codecs that may be used to decode the display signals transmitted by the end-user devices 308(1)-(N). Notably, the transport standards accepted by the system 300 may be limited by the codecs available to display signal decoder 304. In certain embodiments, the transport standard of each display signal may be transmitted across the corresponding peer-to-peer communications channel 310(1)-(N) with the display signal. The transport standard for an end-user device may then be resolved at the network communications element 302, where it is associated with a device name of the end-user device that transmitted the display signal. Each display signal may then be transmitted from the network communication element 302 to the display signal decoder 304. The display signal decoder 304 may then decode each of the display signals using the available codecs.

In certain embodiments, a collaboration manager 318 may be coupled to the system 300 and in communication with both the network communication element 302 and the display stream decoder 304. The collaboration manager 318 may comprise a separate information handling system coupled to and in communication with the system 300, or may be integrated with the system 300. The collaboration manager 318 may receive the device name and transport standard of each of the end-user devices 308(1)-(N). The collaboration manager 302 may also receive the decoded display signals from the display stream decoder 304.

The collaboration manager 318 may generate or otherwise comprise a display interface 320 through which a user may control aspects of the collaborative environment. This may include selecting a subset of the display signals to output to the large screen display and selecting the size and orientation of each selected display signal. The display interface 320 may comprise a software-based interface executed by a processor within the collaboration manager 318. Specifically, the display interface 320 may be displayed or a display device of the collaboration manager 318, and may allow for the collaboration manager to visually manage the collaborative environment. Collaboration managers may include, for example, teachers in classroom settings, presenters in work settings, etc.

The display stream decoder 304 may transmit each of the display signals received at the network communications element 302 to the collaboration manager 318. In certain embodiments, the display signals may be transmitted as thumbnails, or otherwise scaled down versions of the display signals. The collaboration manager 318 may receive the display signals and associate each of the display signals with the correct device name of the corresponding end-user device 308(1)-(N). As can be seen, the display interface 320 may display each of the thumbnails and the corresponding device names in section 350. The display interface 320 may also include a graphical representation 352 of a large screen display coupled to the system 300. In certain embodiments, the graphical representation may change depending on the type and dimensions of the large screen display coupled to the system 300.

In certain embodiments, a user of the collaboration manager 318 may select certain display signals from the thumbnails 350 to include on the large screen display. In the embodiment shown, a user may drag-and-drop a thumbnail in the graphical representation 352 in the display interface 320, positioning the thumbnail within the graphical representation 352 and sizing the thumbnail within the graphical representation 352 as needed. Notably, both the position and size of the thumbnails within the graphical representation 352 may correspond to the position and size of the display signals on the large format display.

The collaboration manager 318 may generate a command based, at least in part, on a selection made within the display interface 320. As described above, the selection may comprise at least a subset of display signals. The command may be send to the display signal decoder 304. The display signal decoder 304 may generate a composite data stream of the display signals from the end-user devices 308(1)-(N). In certain embodiments, the composite data stream may be generated based, at least in part, in the command from the collaboration manager 318. In certain other embodiments, the composite data stream may be generated automatically without commands from the collaboration manager 318.

The display signal decoder 304 may transmit the composite data stream to the output rendering element 306 of the system 300. The output rendering element 306 may process the composite data stream from the display stream decoder based on a video interface type between the system 300 and the large format display 380. For example, the display 380 may be coupled to the system 300 through one of the following interface types: HDMI, Video Graphics Array (VGA), DisplayPort, embedded DisplayPort, Digital Visual Interface (DVI), Low-voltage differential signaling (LVDS), Mobile Industry Processor Interface (MIPI), etc. The output rendering element 306 may encode, package, parse, hash, etc. the composite data stream as need to transmit the composite data stream over the interface to the display 380.

Figure 4:
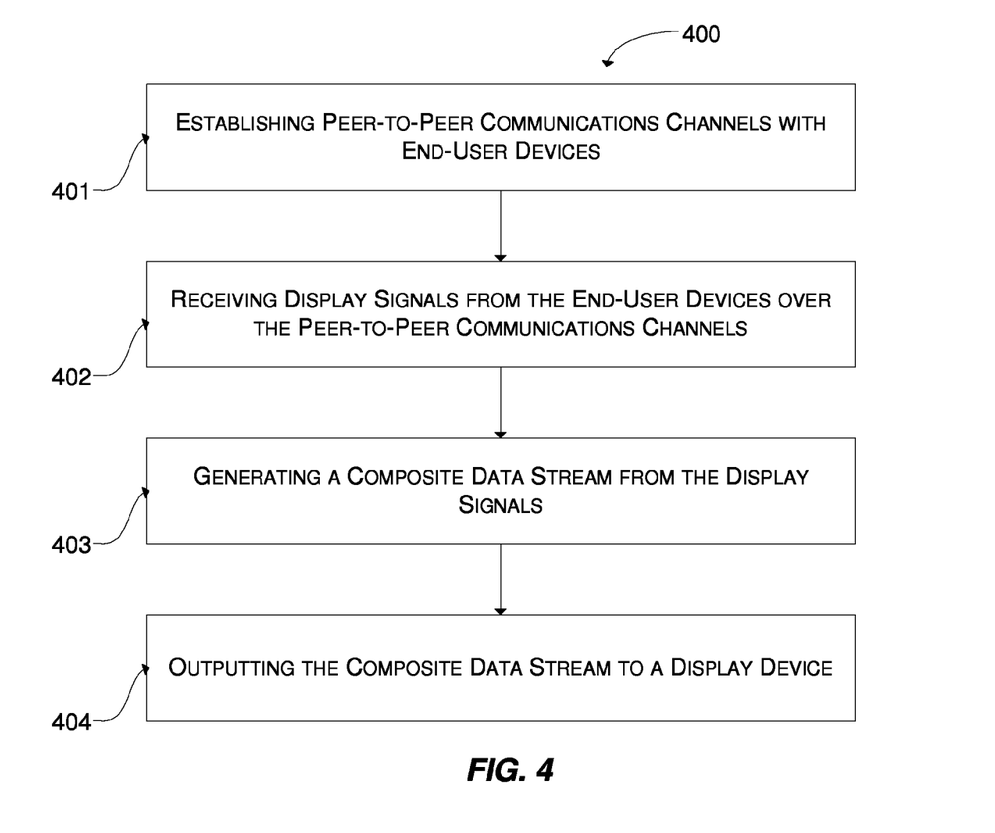
FIG. 4 is a flow diagram of an example method, according to aspects of the present disclosure.

FIG. 4 is a flow diagram of an example method for providing multi-user peer-to-peer collaboration, according to aspects of the present disclosure. Step 401 may comprise establishing peer-to-peer communications channels with end-user devices. Each end-user device may have a corresponding peer-to-peer communications channel. In certain embodiments, establishing peer-to-peer communications channels with end-user devices may comprise establishing peer-to-peer communications channels with end-user devices based, at least in part, on a Wi-Fi Direct standard. In certain embodiments, establishing peer-to-peer communications channels with end-user devices may comprise establishing peer-to-peer communications channels with end-user devices over a plurality of wireless frequency bands, including at least a 2.4 gigahertz (GHz) band, a 5 GHz band, and 60 GHz band. The use of peer-to-peer communications channels may provide flexibility in the number of users and end-user device that may join a collaborative environment.

Step 402 may comprise receiving display signals from the end-user devices over the peer-to-peer communications channels. Each display signal may correspond to a different end-user device and may be transmitted over a different peer-to-peer communications channel. In certain embodiments, the display signals from the end-user devices may be transmitted using a plurality of transport standards. The plurality of transport standards may include at least two of Miracast, DLNA, and WDE. As would be appreciated by one of ordinary skill in view of this disclosure, by allowing different types of transport standards to be used within the method, the multi-user peer-to-peer collaboration method may provide flexibility in the type of end-user devices that may be incorporated into the collaborative environment, including devices made by different manufacturers, who may use different transport standards.

Step 403 may comprise generating a composite data stream from the display signals. The composite data stream may comprise a subset of the display signals. In certain embodiments, the composite data stream may be generated based, at least in part, on a command received from a collaboration manager, which may comprise an information handling system. In such embodiments, the method may include sending the display signals to a collaboration manager and receiving the command from the collaboration manager. The collaboration manager may generate a display interface containing all of the display signals, and a user may select the display signals/end-user devices to display within the collaborative environment. The selection may be used to generate the command. This may allow a user, such as a teacher, to control not only the display signals that are shown in a large format display device, such as a large monitor or projection system, but also the size of the display signals within the large format display device, which may be used to draw focus to certain display signals over others. The composite data stream may also be generated based on a selection from user without requiring that a specific command is generated at a collaboration manager.

Step 404 may comprise outputting the composite data stream to a display device. The composite data stream may include the display signals and their corresponding positions as selected by a user of the collaboration manager. In certain embodiments, the composite data stream may be rendered or processed according to the video interface of the large format display device of the collaborative environment. These may include the video interfaces listed above.

Figure 5:
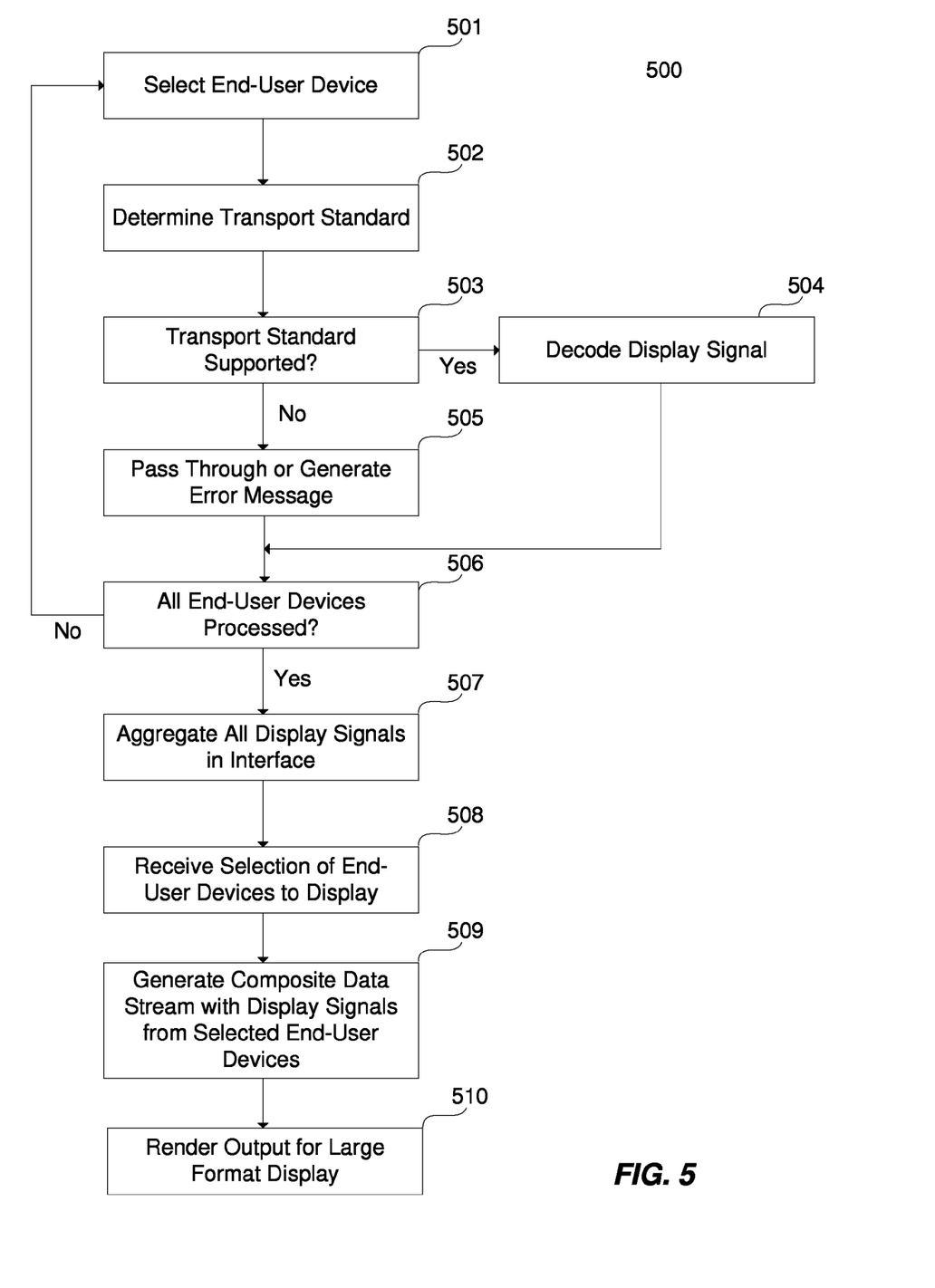
FIG. 5 is a flow diagram of an example method for providing multi-user peer-to-peer collaboration, according to aspects of the present disclosure.

FIG. 5 is a flow diagram of an example method for providing multi-user peer-to-peer collaboration, according to aspects of the present disclosure. As will be appreciated by one of ordinary skill in the art in view of this disclosure, the steps described herein may be implemented as software within an information handling system. Step 501 may comprise selecting an end-user device. This may include selecting an end-user device from a list of end-user devices communicating over peer-to-peer communications channels. Step 502 may include determining a transport standard, such as Miracast, DLNA, and WDE, for the selected end-user device. Step 503 may include determining if the transport standard for the end-user device is supported. This may include querying a list of available codecs to determine if the codec corresponding to the transport standard is available. If the transport standard is supported, the display signal corresponding to the selected end-user device may be decoded at step 504. If the transport standard is not supported, the display signal may either be passed through as is, or an error message may be generated at step 505.

Step 506 may include determining if each end-user device has been processed. If not, the process may return to step 501. If each of the end-user devices has been processed, the process may continue to step 506. Step 506 may include aggregating all of the received display signals from the end-user devices into an interface. These may be presented to a user, who may select a subset of the display signals/end-user devices to display in a large format display of a collaborative environment. Step 508 may include receiving the selection of end-user devices/display signal from the user. The selections may further include the relative size and position of each selected end-user device/display signal. Once received, the selected display signals/end-user devices and their relative positions may be combined to generate a composite data stream in step 509. The large format display output may then be rendered from the composite data stream at step 510. Rendering the output may comprise processing the composite data stream according to a video interface of the large format display.

In certain embodiments, collaboration systems and method according to aspects of the present disclosure may be incorporated into an information handling system. In certain embodiments, the information handling system may include a network communications element and at least one processor coupled to the network communications element. The information handling system may also include memory coupled to the at least one processor. The memory may contain a set of instructions that, when executed by the at least one processor, cause the at least one processor to establish peer-to-peer communications channels with end-user devices using the network communications element. The peer-to-peer communications channels may be established using a WiFi Direct standard.

The set of instructions may further cause the at least one processor to receive display signals from the end-user devices over the peer-to-peer communications channels, with each display signal corresponding to a different end-user device. The set of instructions may further cause the at least one processor to generate a composite data stream from the display signals. The composite data stream may comprise a subset of the display signals. The set of instructions may further cause the at least one processor to output the composite data stream to a display device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Although the present disclosure has been described in detail, it should be understood that various changes, substitutions, and alterations can be made hereto without departing from the spirit and the scope of the invention as defined by the appended claims. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A multi-user peer-to-peer collaboration system, comprising:
    a network communications element operable to establish peer-to-peer communications channels with end-user devices and receive display signals from the end-user devices over the peer-to-peer communications channels, wherein each display signal corresponds to a different end-user device, wherein the network communications element includes a virtual media access control (VMAC) address, and wherein each of the end-user devices has a separate media access control (MAC) address that uniquely identifies each respective end-user device;
    one or more peer-to-peer communications channels between the network communications element and the end-user devices, wherein the one or more peer-to-peer communications channels are established using VMAC;
    a transport standard associated with each of the end-user devices, wherein the transport standard for each respective end-user device is resolved at the network communications element;
    a collaboration manager;
    a display interface, generated by the collaboration manager, that contains all of the display signals;
    a selection of the display signals from the display interface, wherein the selection of the display signals comprises a subset of the display signals;
    a selection of one or more of the end-user devices;
    a command, generated by the collaboration manager, based, at least in part, on the selection of the display signals and the selection of the one or more of the end-user devices;
    a display signal decoder operable to generate a composite data stream of the display signals based, at least in part, on the command received from the collaboration manager, wherein the composite data stream comprises the subset of the display signals; and
    an output rendering element operable to output the composite data stream to a display device.

2. The system of claim 1, wherein the network communications element is further operable to establish peer-to-peer communications channels with end-user devices based, at least in part, on a Wi-Fi Direct standard.

3. The system of claim 1, wherein the network communications element is further operable to establish peer-to-peer communications channels with end-user devices over a plurality of wireless frequency bands, including at least a 2.4 gigahertz (GHz) band, a 5 GHz band, and a 60 GHz band.

4. The system of claim 1, wherein the network communications element dynamically connects a new end-user device.

5. The system of claim 1, wherein the network communications element is further operable to receive display signals transmitted using a plurality of transport standards.

6. The system of claim 5, wherein the plurality of transport standards include Miracast, Digital Living Network Alliance (DLNA), and WiGig Display Extension (WDE).

7. The system of claim 1, wherein the collaboration manager is an information handling system coupled to and in communication with the collaboration system.

8. The system of claim 1, wherein the display signal decoder is a dedicated graphics processor.

9. The system of claim 1, wherein the display device comprises a large screen display device coupled to the output rendering element through a video interface.

10. A method for providing multi-user peer-to-peer collaboration, comprising:
    establishing, by a network communications element, peer-to-peer communications channels with end-user devices;
    receiving display signals from the end-user devices over the peer-to-peer communications channels, wherein each display signal corresponds to a different end-user device, wherein the network communications element includes a virtual media access control (VMAC) address, and wherein each of the end-user devices has a separate media access control (MAC) address that uniquely identifies each respective end-user device;
    establishing one or more peer-to-peer communications channels between the network communications element and the end-user devices, wherein the one or more peer-to-peer communications channels are established using VMAC;
    resolving at the network communications element a transport standard associated with each of the end-user devices;
    generating a display interface by a collaboration manager that contains all of the display signals;
    determining a selection of the display signals from the display interface, wherein the selection of the display signals comprises a subset of the display signals;
    determining a selection of one or more of the end-user devices;
    generating a command by the collaboration manager based, at least in part, on the selection of the display signals and the selection of the one or more of the end-user devices;
    generating by a display signal decoder a composite data stream from the display signals based, at least in part, on the command received from the collaboration manager, wherein the composite data stream comprises the subset of the display signals; and
    outputting the composite data stream to a display device.

11. The method of claim 10, wherein establishing peer-to-peer communications channels with end-user devices comprises establishing peer-to-peer communications channels with end-user devices based, at least in part, on a Wi-Fi Direct standard.

12. The method of claim 10, wherein establishing peer-to-peer communications channels with end-user devices comprises establishing peer-to-peer communications channels with end-user devices over a plurality of wireless frequency bands, including at least a 2.4 gigahertz (GHz) band, a 5 GHz band, and 60 GHz band.

13. The method of claim 10, wherein the display signals from the end-user devices are transmitted using a plurality of transport standards.

14. The method of claim 13, wherein the plurality of transport standards include at least two of Miracast, Digital Living Network Alliance (DLNA), and WiGig Display Extension (WDE).

15. The method of claim 10, wherein
    the collaboration manager is an information handling system coupled to and in communication with the network communication element and the display signal decoder.

16. The method of claim 10, wherein the display signal decoder is a dedicated graphics processor.

17. An information handling system, comprising:
a network communications element;
at least one processor coupled to the network communications element; and
memory coupled to the at least one processor, wherein the memory contains a set of instructions that, when executed by the at least one processor, cause the at least one processor to:
- establish peer-to-peer communications channels with end-user devices using the network communications element;
- receive display signals from the end-user devices over the peer-to-peer communications channels, wherein each display signal corresponds to a different end-user device, wherein the network communications element includes a virtual media access control (VMAC) address, and wherein each of the end-user devices has a separate media access control (MAC) address that uniquely identifies each respective end-user device;
- establish one or more peer-to-peer communications channels between the network communications element and the end-user devices, wherein the one or more peer-to-peer communications channels are established using VMAC;
- resolve at the network communications element a transport standard associated with each of the end-user devices;
- generating a display interface by a collaboration manager that contains all of the display signals;
- determine a selection of the display signals from the display interface, wherein the selection of the display signals comprises a subset of the display signals;
- determine a selection of one or more of the end-user devices;
- generate a command by the collaboration manager based, at least in part, on the selection of the display signals and the selection of the one or more of the end-user devices;
- generate by a display signal decoder a composite data stream from the display signals based, at least in part, on the command received from the collaboration manager, wherein the composite data stream comprises the subset of the display signals; and
- output the composite data stream to a display device.

18. The information handling system of claim 17, wherein the display signals are transmitted using a plurality of transport standards, including at least two of Miracast, Digital Living Network Alliance (DLNA), and WiGig Display Extension (WDE).

19. The information handling system of claim 17, wherein the collaboration manager is a second information handling system coupled to and in communication with the information handling system.

20. The information handling system of claim 19, wherein the set of instructions further cause the at least one processor to establish the peer-to-peer communications channels with the end-user devices based, at least in part, on a Wi-Fi Direct standard.

* * * * *